United States Patent [19]
Pierce

[11] 3,958,460
[45] May 25, 1976

[54] SEWING MACHINE NOISE AND VIBRATION REDUCTION

[75] Inventor: Bernard N. Pierce, West Hartford, Conn.

[73] Assignee: The Merrow Machine Company, Hartford, Conn.

[22] Filed: Apr. 25, 1974

[21] Appl. No.: 464,261

Related U.S. Application Data

[62] Division of Ser. No. 356,851, May 3, 1973, Pat. No. 3,812,802.

[52] U.S. Cl. .................................. 74/57; 308/233; 308/187.1
[51] Int. Cl.² ........................................ F16H 25/12
[58] Field of Search ................ 74/57, 58; 308/232, 308/233, 234, 235, 187.1

[56] References Cited
UNITED STATES PATENTS

| | | | |
|---|---|---|---|
| 1,766,224 | 6/1930 | Montevaldo | 74/58 |
| 2,351,890 | 6/1944 | Turner | 308/233 |
| 2,673,768 | 3/1954 | Douglas | 308/233 |
| 3,332,536 | 7/1967 | Ebly et al. | 308/187.1 |
| 3,345,115 | 10/1967 | Olender et al. | 308/187.1 |
| 3,433,543 | 3/1969 | Eck | 308/235 |
| 3,572,862 | 3/1971 | Teramachi | 308/235 |
| 3,682,005 | 8/1972 | Frantz | 74/58 |

*Primary Examiner*—Samuel Scott
*Assistant Examiner*—Wesley S. Ratliff, Jr.
*Attorney, Agent, or Firm*—Beveridge, DeGrandi, Kline & Lunsford

[57] ABSTRACT

Noise and vibration are reduced in an axial cam drive mechanism by spring loading the rotary cam assembly to one end of its limit of axial travel. The spring load is applied through an antifriction axial thrust bearing, and is reacted by a second antifriction axial thrust bearing. The spring load applied exceeds the axial component of the maximum reaction load applied by the cam driven mechanism during operation so that there is no tendency of the rotary cam assembly to shift axially upon reversal of the reaction load.

7 Claims, 4 Drawing Figures

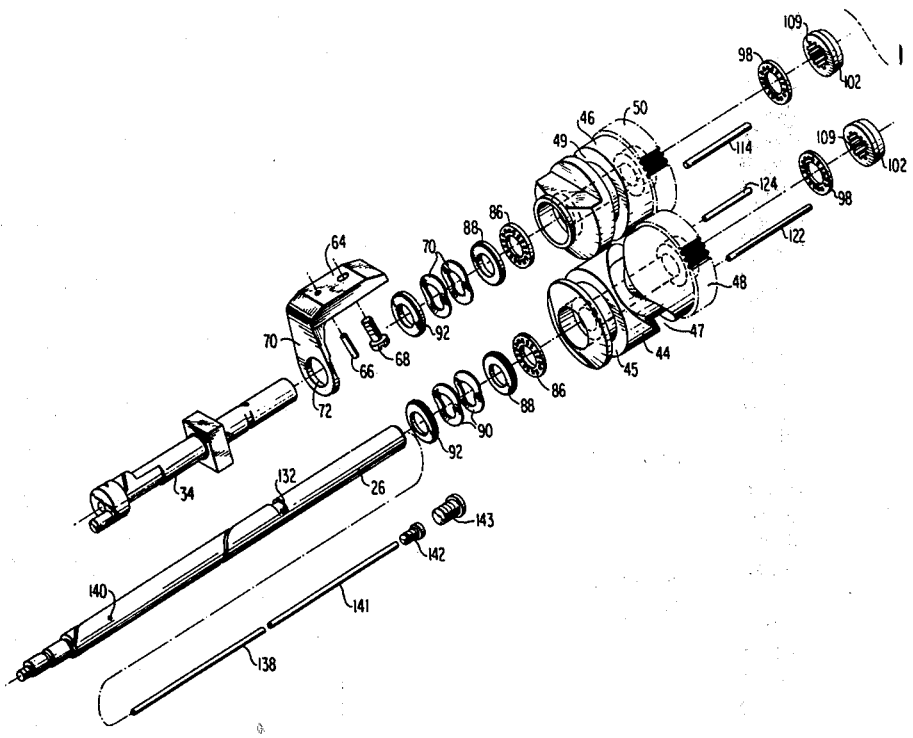

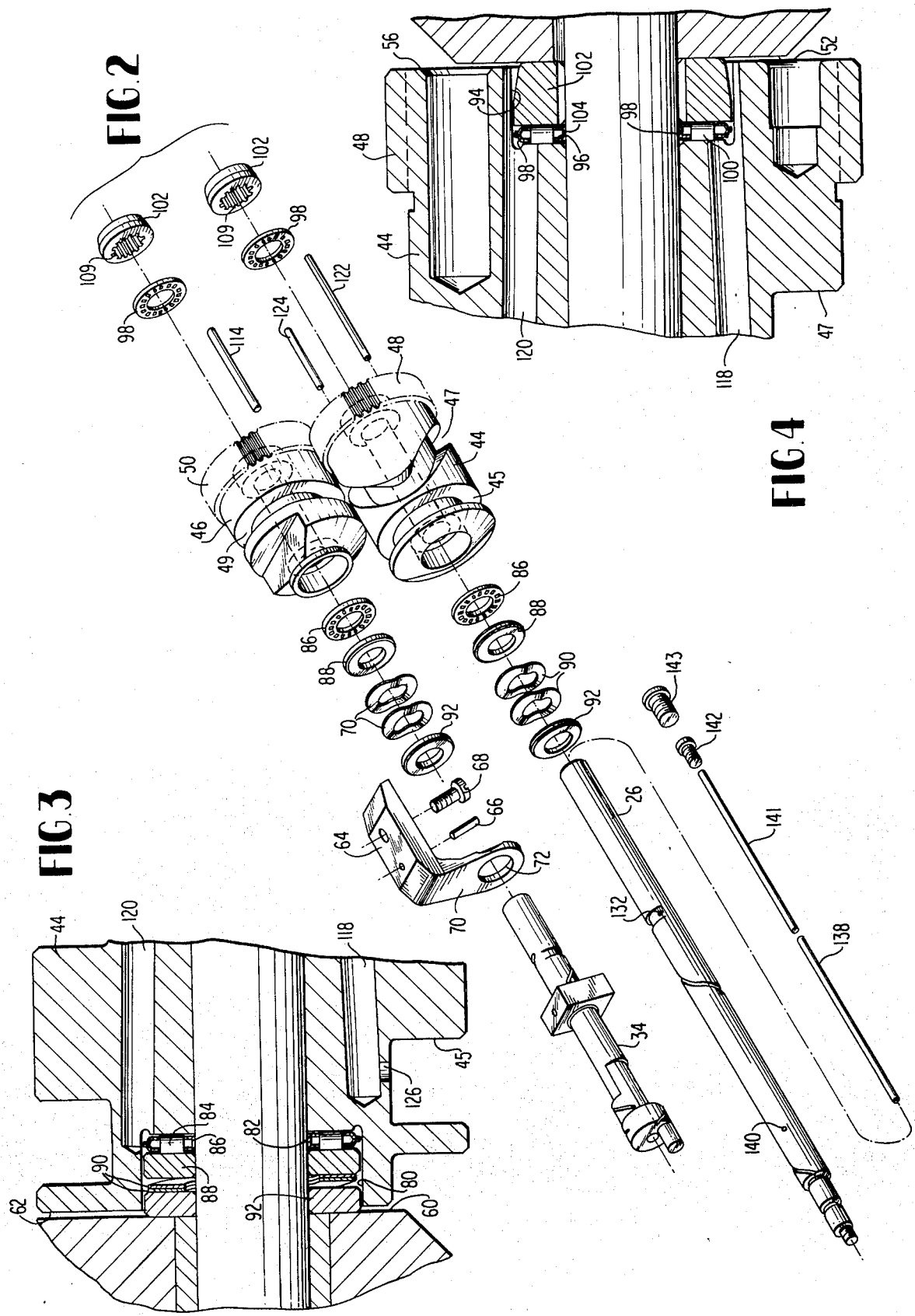

SEWING MACHINE NOISE AND VIBRATION REDUCTION

This is a division, of application Ser. No. 356,851, filed May 3, 1973.

BACKGROUND OF THE INVENTION

This invention relates to the reduction of vibration and noise in high speed precision machines and more particularly to an improved means for reducing the vibration and noise resulting from undesired axial movement of drive cams in an axial cam drive mechanism, such as employed in high speed sewing machines.

DESCRIPTION OF THE PRIOR ART

In many types of modern machinery, axial cams are employed to drive working elements in a direction to impart a component of movement parallel to the axis of rotation of the drive cams. This produces a reaction force tending to move the cam along its axis between the limits of necessary running clearance established by restraining bosses or bearing surfaces, resulting in the drive cam striking one of the opposed restraining bosses upon each reversal of the driven member. The repeated driving of the cam between its opposed axial stops produces objectionable noise and vibration, particularly in high speed machines such as industrial sewing machines which require the continuous close attendance of an operator.

While certain aspects of the invention may be appropriate for general application, other features are particularly applicable to an overedge sewing machine of the well-known "Merrow" type illustrated, for example, in my prior U.S. Pat. No. 2,879,733. Accordingly, the invention will be described herein with particular reference to such an overedge sewing machine in which a shaft driven needle cooperates with a lower and an upper looper to form an overedge seam. The loopers are mounted on looper carriers having cam followers thereon actuated by a pair of grooved cam cylinders mounted for rotation about their longitudinal axes within the machine's rigid frame. The cam cylinders are rigidly mounted on spaced parallel shafts which, in turn, are journalled for rotation in the frame, and the cylinders and their respective shafts are restrained, within the necessary limits of running clearance, against axial movement by opposed bearing surfaces within the frame which engage the radial end faces on the respective cam cylinders. Although the mass of the respective cam cylinders and their associated shafts is substantially greater than the driven looper carriers and their associated driven components, the reaction force produced by the looper carriers during high speed operation of the machine is, nevertheless, sufficient to drive the cam cylinders in an axial direction back and forth in the main frame to strike each of the restraining bosses upon each revolution of the cams. Assuming that the machine is being driven at a rate of 6600 rpm, the two cams, each hitting their opposed restraining bosses on each revolution, will produce 440 impacts per second. Thus it is apparent that this slight axial movement of the relatively heavy axial cam cylinders can be a major source of objectionable noise and vibration. It is, accordingly, a primary object of the present invention to greatly reduce or completely eliminate noise and vibration resulting from axial shifting of drive cam cylinders in an axial cam driven mechanism.

Another object of the invention is to provide an improved axial cam driven machine in which axial shifting of the driving cam cylinders is avoided without interfering with the necessary running clearances required for high speed operation of the cam cylinders.

SUMMARY OF THE INVENTION

In the attainment of the foregoing and other objects, an important feature of the present invention resides in providing antifriction axial thrust bearings between the ends of the axial cam cylinders and their opposed restraining bosses, and providing a resilient compression spring member between one of the axial thrust bearing assemblies and its adjacent restraining boss to spring load the cam cylinder and its associated shaft against the opposed restraining boss. The spring force is maintained at a level exceeding that which may be generated by the reaction of the elements driven by the cam so that, regardless of the reaction forces, there is no tendency for the cam to shift axially during operation of the machine as a result of the reaction forces. Since the spring force acts on the cam through the antifriction axial thrust bearing, this axial load on the cams has little, if any, effect on the power required to operate the mechanism. At the same time, the compression spring can readily be designed to accommodate greater tolerances than were possible in the prior art devices.

BRIEF DESCRIPTION OF THE DRAWINGS

Other objects and features of the invention will hereinafter become apparent from the arrangements and combinations of parts as fully set forth in the following detailed description of a preferred embodiment of the invention illustrated in the accompanying drawings in which:

FIG. 2 is an exploded view of the axial cam cylinders and associated components illustrated in FIG. 1;

FIG. 3 is an enlarged fragmentary sectional view of one end of the lower cam cylinder shown in FIG. 1; and FIG. 4 is an enlarged fragmentary sectional view of the opposite end of the cam cylinder shown in FIG. 3.

DESCRIPTION OF THE PREFERRED EMBODIMENT

Figure 1:
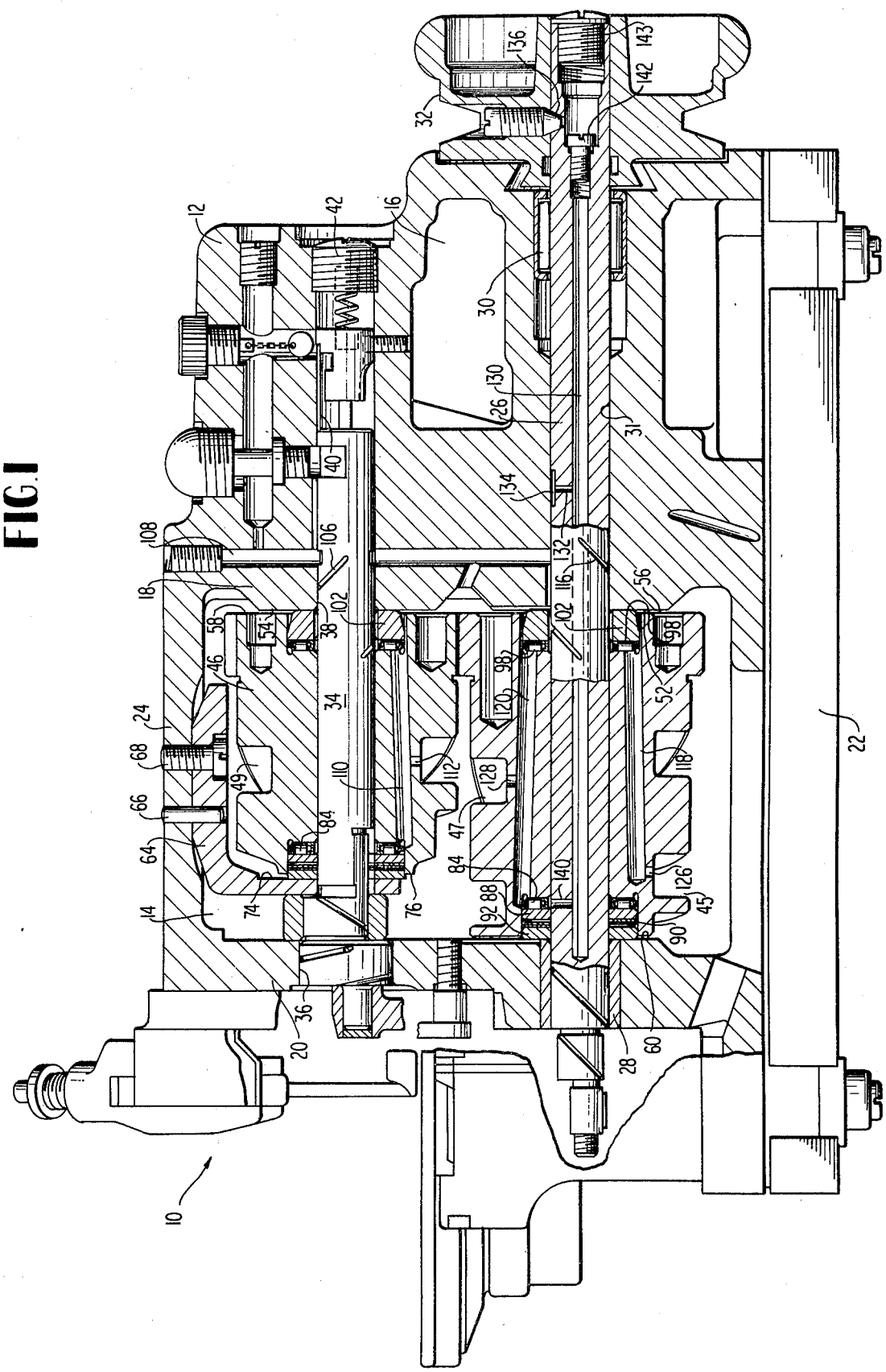
FIG. 1 is an elevation view, in section, of an overedge sewing machine embodying the invention.

Referring now to the drawings in detail, a cam driven overedge sewing machine emobdying the present invention is indicated generally in FIG. 1 by the reference numeral 10, and includes a main casting 12 having a mechanism compartment 14 and an oil reservoir compartment 16, with the mechanism compartment and oil reservoir being separated by a partition 18 extending between the front and back walls of the machine. An end wall 20 formed as an integral part of the frame 12 and extending substantially parallel to the partition 18 cooperates with a base plate 22 and top wall portion 24 to complete the enclosure for the mechanism compartment 14.

A main or lower drive shaft 26 extends through the frame 12 and is journalled for rotation by suitable bearings such as the bushing 28, needle bearing 30 and the inner bearing surface of bore 31. A combined V-belt drive pulley and hand wheel 32 is mounted on the end of shaft 26 projecting outwardly from the frame 12.

A second or auxiliary shaft 34 is mounted in frame 12 for rotation about its longitudinal axis which extends parallel to the axis of shaft 26. Auxiliary shaft 34 is journalled for rotation by a bearing 36 machined in the end wall 20 and a second plain bearing 38 defined by a bore 40 extending through the partition 18 to the end of the machine frame 12. A screw plug 42 normally closes the end of the bore 40. A lower cam cylinder 44 is rigidly mounted, as by set screws, not shown, on the main shaft 26 within the mechanism compartment 14, and a second cam cylinder 46 is similarly mounted on the auxiliary shaft 34. As seen in FIG. 2, lower cam cylinder 44 has a pair of cam grooves 45, 47 and a spur gear 48 formed on its cylindrical surface. The upper cam cylinder 46 has a cam groove 49 and a similar spur gear 50 on its outer surface, with gears 48, 50 meshing so that rotation of the lower cam cylinder 44 by the main drive shaft 26 will also drive the upper cam cylinder 46 and its associated auxiliary drive shaft 34.

Partition wall 18 has integrally formed thereon a pair of outwardly protruding thrust bearing surfaces, or bosses 52, 54, with the thrust bearing surface 52 surrounding the lower shaft 26 and extending in parallel opposed relation to the right end surface 56, as viewed from the front of the machine, of the lower cam cylinder 44. Similarly, thrust bearing surface 54 surrounds the auxiliary shaft 34 and extends in parallel opposed relation to the right end surface 58 of upper cam cylinder 46. A third thrust bearing surface, or boss 60 is formed on the end wall 20 in parallel opposed relation to thrust bearing surface 52, and extending in parallel opposed relation to the left end face of the lower cam cylinder 44. Thus, thrust bearing surfaces 52, 54 restrain movement of the cam cylinders 44, 46, and their associated shafts, in the right-hand direction as viewed in FIG. 1, while thrust bearing surface 60 limits movement of the lower cam cylinder to the left.

Movement of the upper cam cylinder to the left, again as viewed in FIG. 1, is restricted by an upper cam thrust bracket 64 mounted by aligning pin 66 and screw 68 extending into the top wall 24. The cam thrust bracket 64 includes a downwardly projecting cantilevered arm 70 having a circular aperture 72 formed therein for receiving the auxiliary shaft 34, with a thrust bearing surface 74 extending in opposed parallel relation to the left end face 76 of the upper cam cylinder 46. In the unstressed condition, the bearing surface 74 is inclined at a slight angle with respect to the longitudinal axis of the auxiliary shaft 34 so that, when a load is applied parallel to the axis of the auxiliary shaft, the surface 74 will assume an attitude perpendicular to the shaft and parallel to the thrust bearing surface 54.

Endless cam tracks 45, 47, 49 extending around and into the outer periphery of cylinders 44, 46 normally engage cam followers, not shown, on the machine's upper and lower looper carriers in the manner illustrated in my above-mentioned patent, the disclosure of which is incorporated herein by reference for purposes of illustrating the operation of the loopers and related mechanisms as well as the primary lubrication and sealing systems of the machine.

2 is well-known, the reaction force applied to the cam cylinders 44, 46 by the cam followers running in the cam tracks tends to shift the cam cylinders and their associated shafts in an axial direction between the opposed thrust bearing surfaces disposed at the opposed ends of the respective cam cylinders. Although extreme care is exercised in production of the equipment, some finite running clearance is required to avoid excess friction and wear and to avoid binding due to heat differentials, or the like. In the prior art machines of the type illustrated in my aforementioned patent, this running clearance was normally maintained at a maximum of 2 mils, and the cam cylinders were thus subject to being driven back and forth between the opposed confining thrust bearings on the frame, within these limits, upon every revolution of the respective cam cylinders by the reaction forces of the cam followers and their associated driven components.

To overcome this tendency of the cam cylinders to be shifted back and forth, and to eliminate any noise and vibration generated thereby, according to the present invention, the respective cam cylinders are provided with a spring loaded antifriction thrust bearing system which spring loads the cam cylinders to one end with an axial force which exceeds the maximum axial component of the reaction force applied by the cam followers during normal operation of the machine. Since the spring loaded thrust bearing system of the respective cam followers are substantially identical, only the system for the lower cam cylinder 44 will be described in detail herein, it being understood that the description applies equally to the system for the upper cam cylinder 46. Further, identical reference numerals will be applied to identify corresponding elements of the spring-loaded thrust bearing system of the cam cylinders 44 and 46.

Referring now to FIGS. 2 and 3, it is seen that cam cylinder 44 has a concentric counterbore 80 formed in its left end and terminating in a radial face 82 spaced inwardly from and parallel to the end face 62. The radial face 82 is carefully machined to form the inner race of an axial thrust bearing assembly which includes a plurality of radially extending rollers 84 spaced by a suitable bearing retainer 86 and an outer race defined by a relatively thick annular washer 88. A pair of similar corrugated spring washers 90 are positioned within the bore 80 and bear against the outwardly directed face of the outer race 88, and a second relatively heavy metal washer 92 bears against the outer face of the spring washers. The dimension of the rollers 84, the outer race 88, the spring washers 90, and the metal washer 92 is such that their combined thickness is slightly greater than the depth of the counterbore 80 so that the outer surface of the washer 92 normally bears against the thrust boss 60 to maintain the radial face 62 of the cam cylinder 44 spaced therefrom a slight distance. Since the spring washers 90 are in surface-to-surface contact with the outer race 88 and the metal washer 92, the race 88 and spring washers 90 are stationary during operation of the machine.

Referring now to FIG. 4, it is seen that a second concentric counterbore 94 is formed in the right end of cam cylinder 44, with the counterbore terminating in a radial face 96 defining the inner race of a second axial thrust bearing assembly. The second thrust bearing assembly includes a bearing retainer 98 which holds a plurality of radially disposed rollers 100 and an annular spacer 102 having a radial inner face defining the outer race of the bearing. The spacer 102 has a thickness, or axial dimension which, combined with the diameter of the rollers 100, is slightly greater than the depth of the counterbore 94 so that the radial end face 56 of the cam cylinder 44 is retained in closely spaced relation to the thrust bearing surface 52.

When the axial thrust bearing assemblies are assembled into the opposed ends of the cam cylinder 44, their overall axial dimension is slightly greater than the space between the opposed thrust bearing surfaces 52, 60 so that the spring washers 90 must be compressed to position the overall assembly between these thrust bosses. In this condition, the spring washers 90 exert an axial force against the outer race 88 which forces the cam cylinder toward the partition wall 18 to retain the spacer 102 into firm contact with the thrust bearing surface 52. The force exerted by the spring washers 90 is greater than that generated by the reaction of the looper carrier cam followers so that, during operation of the machine, there is no axial movement of the cam cylinder and shaft.

By selection of spring washers 90 having the proper spring constant, the required axial load can be applied to the cam cylinder without applying excessive load to the axial thrust bearings while still permitting some tolerance in the spacing between the opposed thrust bosses 52, 60. Further, since the end faces 56, 62 are no longer critical bearing faces, the dimensional tolerances and surface finishes of these faces are no longer as critical as in the prior art machines.

To supply lubricating oil to the axial thrust bearing assemblies on the upper cam cylinder 46, a spiral groove 106 is formed in the outer surface of the auxiliary shaft 34, with the groove extending from a position communicating with the normally pressurized vertical oil channel 108 of the machine's pressure lubricating system. The spiral groove 106 extends past the inner race 96 and is formed to propel lubricating oil from the channel 108 axially along the shaft to lubricate the bearing 38, with the excess lubricating oil being carried into the thrust bearing assembly. To allow the oil conveying groove 109 to impel oil through spacer member 102 more freely, the axial bore of the spacer member has a plurality of axially extending grooves 109 formed around its inner periphery.

Excess oil supplied into the counterbore 94 will be thrown by centrifugal force toward the outer cylindrical surface of the counterbore and a portion thereof will flow into the longitudinally extending, diverging oil channel 110 to be conveyed by centrifugal force axially through the cam cylinder 46 and discharged into the counterbore 80 at the left end of the cam cylinder to lubricate the left-hand axial thrust bearing assembly. A portion of the oil passing through channel 110 is thrown centrifugally through an aperture 112 to lubricate the cam track 49 and the cam follower disposed therein. A loose metering rod 114 disposed within the channel 110 assures that a portion of the oil flowing through the channel will be conveyed past the radial hole 112 to lubricate the thrust bearing assembly. Also, it is pointed out that the spacer 102, the outer race 88, and washer 92 have outside diameters slightly less than the diameter of the counterbores within which they are received so that excess lubricating oil can flow axially therepast and be discharged into the mechanism compartment 14.

The spacer 102 has an outer peripheral surface which is slightly cone-shaped so that excess lubricating oil which flows by gravity around the periphery of this spacer, or outer race and collecting at the bottom of the counterbore 94 will then tend to flow, by gravity and capillary action along the inwardly and downwardly inclined cone-shaped outer surface of the spacer into the counterbore 94. This tendency for the oil to flow inward into the counterbore further assures a continuous supply of lubricating oil in addition to that supplied by the spiral groove 106.

A similar araangement is employed to supply lubricating oil to the axial thrust bearings of the lower cam cylinder. Thus, the spiral groove 116 conveys lubricating oil from the channel 108 into the counterbore 94 in the same manner as with the bearings on the upper cam 46. Excess lubricating oil flows from the counterbore into two axially extending, outwardly diverging channels 118, 120 to supply lubricating oil to cam followers positioned within cam grooves 45, 47, respectively, and to supply lubricating oil to the thrust bearings at the left end of the cam cylinder 44. Metering rods 122, 124 are positioned within the channels 118, 120, respectively and a radially extending opening 126 in the channel 118 supplies lubrication to the cam track 45 and the cam follower disposed therein. A similar radially extending opening 128 permits a portion of the lubricating oil flowing in channel 120 to escape to lubricate the cam track 47 and the cam follower disposed therein, with the metering rod 124 conveying the remainder of the oil past the opening 128 to be discharged into the counterbore 80 to lubricate the axial thrust bearing at the left end of the cam cylinder 44.

As seen in FIG. 1, the main shaft 26 has an axially extending bore 130 formed therein from its right-hand, or drive end and terminating adjacent the left end. A radially extending opening 132 formed in the shaft from the trailing edge of the machine's oil scavenge pump eccentric 134 provides a fluid passage admitting a portion of the lubricating oil pumped by the scavenge pump to flow into the axial bore 130 of shaft 26. Metering and conducting rods 138, 141 are positioned within bore 130 and radially extending opening 140 supplies additional lubricant to the axial thrust bearing at the left end of cam cylinder 44. Screw 142 is provided near the right end of bore 130 to retain metering and conducting rods 138, 141 and to seal bore 130 so that all of the lubricant therein is directed to opening 140 and cannot escape through opening 136 to contaminate the V-belt drive groove in drive pulley 32. Screw 143 is provided at the extreme right hand end of bore 130 as a safety precaution and to permit convenient use of certain types of tachometers in measuring the speed of the sewing machine. Thus, the axial thrust bearings are continuously supplied with an excess of lubricating oil to always assure adequate lubrication of the high speed bearings.

From the above, it is apparent that the vibration and noise resulting from repeated impacts between the main cams and the restraining bosses on the frame have been eliminated by preloading the cams into continuous contact with one thrust bearing on the frame. By applying the preload to the cam through an axial antifriction bearing, and providing an axial antifriction thrust bearing at the opposite end of the cam, the repeated impacts and associated noise are eliminated without adversely effecting the operation of the machine.

While I have disclosed and described a preferred embodiment of my invention, I wish it understood that I do not intend to be restricted solely thereto, but that I do intend to include all embodiments thereof which would be apparent to one skilled in the art and which come within the spirit and scope of my invention.

What is claimed is:

1. In a cam drive mechanism including a cam cylinder mounted in a fixed frame for rotation about a longitudinal axis, a pair of oppositely directed substantially radially extending shoulders on said cam cylinder and disposed in closely spaced opposed relation one to each of a pair of radially extending fixed bearing surfaces on said frame, an endless cam track extending around the outer periphery of said cam cylinder for engaging and driving a cam follower in a direction having a component extending parallel to said longitudinal axis whereby said cam follower applies a reaction force tending to move said cam cylinder axially between said fixed bearing surfaces upon rotation of said cam cylinder, the improvement comprising a pair of antifriction axial thrust bearing assemblies each including a plurality of radially extending antifriction roller bearing elements retained in an open bearing cage and mounted one between each of said shoulders and the opposed fixed bearing surface and engaging a substantially radially extending inner race rotating with said cam, a pair of outer races in the form of annular washers having a substantially radially extending bearing surface mounted on said shaft one between each thrust bearing and the adjacent fixed bearing surface and normally retained against rotation, compression spring means mounted between one of said outer races and the adjacent opposed fixed bearing surface, said compression spring means continuously applying an axial force urging said one outer race and its associated axial thrust bearing and thereby said cam cylinder toward the other said axial thrust bearing with an axial force greater than said reaction force whereby movement of said cam cylinder along said longitudinal axis by said reaction force is prevented, and means supplying lubricating oil through one of said outer races for lubricating the associated thrust bearing and the cam track.

2. In a cam drive mechanism as defined in claim 1, the further improvement wherein said compression spring means comprises at least one spring washer mounted between said one axial thrust bearing and the adjcent outer race.

3. In a cam drive mechanism as defined in claim 2, the further improvement wherein said axial thrust bearing assemblies each comprise a plurality of radially extending antifriction rollers disposed between an inner race adapted to rotate with said cam cylinder means and an outer race, and wherein said spring washer applies an axial force to and normally restrains said outer races against rotation.

4. The cam drive mechanism as defined in claim 2 further comprising a rigid annular washer disposed between said spring washer and the adjacent fixed bearing surface.

5. The cam drive mechanism as defined in claim 3 wherein said inner races are defined by said substantially radially extending shoulders on said cam cylinder.

6. In a cam drive mechanism as defined in claim 1, the further improvement wherein said means for supplying lubricating oil between said shaft and said one outer race including means for supplying lubricating oil to each of said axial bearing assemblies.

7. The cam drive mechanism as defined in claim 6 wherein said means for supplying lubricating oil comprises a fluid passage extending through said cam cylinder means from a position adjacent said other axial bearing assembly.

* * * * *